United States Patent
Brouwer

(10) Patent No.: US 6,760,303 B1
(45) Date of Patent: Jul. 6, 2004

(54) CHANNEL-TYPE SWITCHING BASED ON CELL LOAD

(75) Inventor: Frank Brouwer, Ga Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/537,689

(22) Filed: Mar. 29, 2000

(51) Int. Cl.[7] .............................. H04J 3/16; H04Q 7/38
(52) U.S. Cl. .................... 370/229; 370/431; 370/437
(58) Field of Search .......................... 370/229, 230 L, 370/232, 235, 238, 328, 329, 335, 342, 352, 353, 431, 441, 464, 465, 437

(56) References Cited

U.S. PATENT DOCUMENTS

| | | | |
|---|---|---|---|
| 4,979,168 A | 12/1990 | Courtois et al. | 370/349 |
| 5,379,446 A | 1/1995 | Murase | 455/444 |
| 5,495,480 A | 2/1996 | Yoshida | 370/389 |
| 5,535,425 A * | 7/1996 | Watanabe | 455/436 |
| 5,673,259 A * | 9/1997 | Quick, Jr. | 370/342 |
| 5,708,656 A | 1/1998 | Noneman et al. | 370/335 |
| 5,729,534 A | 3/1998 | Jokinen et al. | 370/280 |
| 5,757,772 A | 5/1998 | Thornberg et al. | 370/236 |
| 5,793,747 A | 8/1998 | Kline | 370/230 |
| 5,796,722 A | 8/1998 | Kotzin et al. | 370/252 |
| 5,859,853 A | 1/1999 | Carlson | 370/468 |
| 5,903,840 A | 5/1999 | Bertacchi | 455/436 |
| 5,918,182 A | 6/1999 | Korus et al. | 455/517 |
| 6,507,567 B1 * | 1/2003 | Willars | 370/321 |

FOREIGN PATENT DOCUMENTS

| | | |
|---|---|---|
| EP | 0 472 511 A2 | 2/1992 |
| WO | WO 95/35637 | 12/1995 |
| WO | WO 98/24199 | 6/1998 |
| WO | WO 00/35226 | 6/2000 |
| WO | WO 01/31948 | 5/2001 |

* cited by examiner

Primary Examiner—John Pezzlo
Assistant Examiner—Saba Tsejaye
(74) Attorney, Agent, or Firm—Nixon & Vanderhye P.C.

(57) ABSTRACT

A system and corresponding method of controlling switching between different types of channels in a cellular communications system (e.g., wideband CDMA). Timer timeout values (i.e., timer lengths) and/or buffer thresholds, used in determining if and when to switch from one type of channel to another for a given user connection, are chosen and/or dynamically adjusted based upon at least estimated or measured traffic load in a cell in which the user is located.

14 Claims, 12 Drawing Sheets

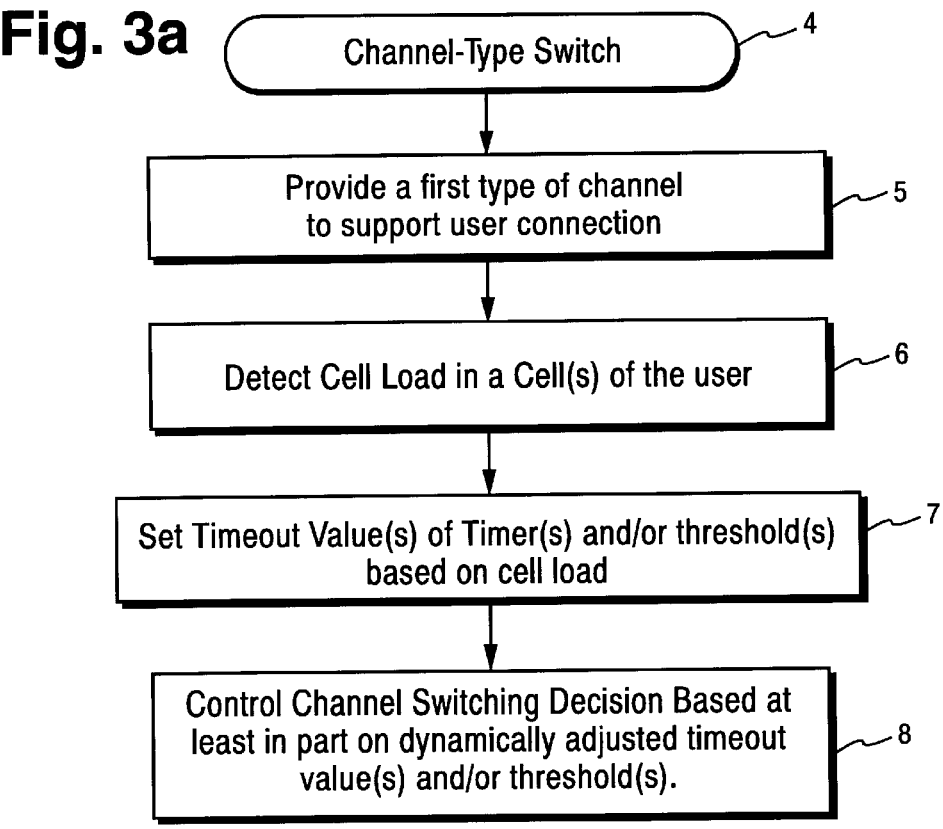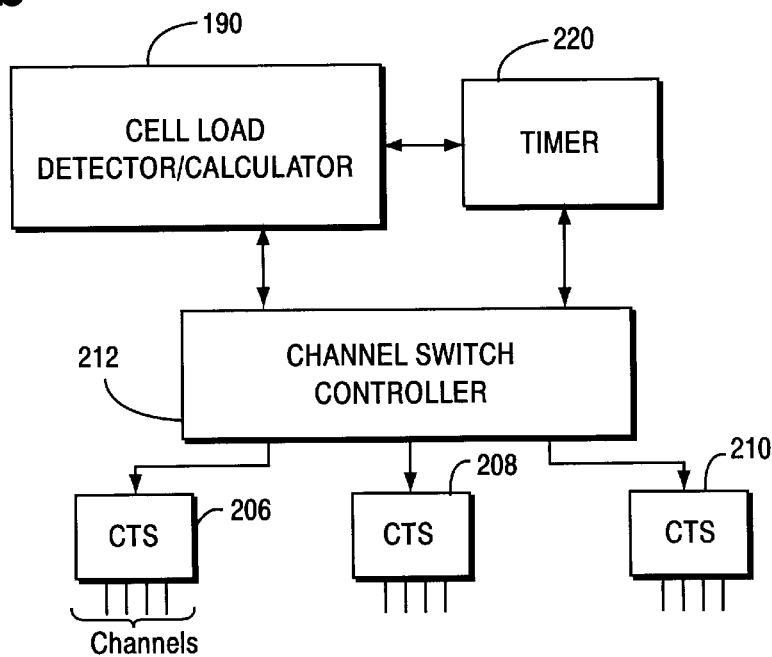

CHANNEL-TYPE SWITCHING BASED ON CELL LOAD

RELATED APPLICATIONS

This application is related to commonly assigned patent application Ser. No. 09/430,165, filed Oct. 29, 1999, entitled "Channel-Type Switching from a Common Channel to a Dedicated Channel Based on Common Channel Load" (now U.S. Pat. No. 6,519,461) and Ser. No. 09/429,497, filed Oct. 29, 1999, entitled "Channel-type Switching to a Common Channel Based on Common Channel Load", the entire disclosures of which are both hereby incorporated herein by reference.

FIELD OF THE INVENTION

The present invention relates to data packet communications, and in particular, to controlling switching between communication channels of different types in a Wideband Code Division Multiple Access (W-CDMA) cellular communications network.

BACKGROUND OF THE INVENTION

In current and future mobile radio communications systems, a variety of different services either are or will be provided. While mobile radio systems have traditionally provided circuit-switched services, e.g., to support voice calls, packet-switched data services are becoming increasingly utilized. Exemplary packet data services include e-mail, file transfers, and information retrieval using the Internet. Because packet data services often utilize system resources in a manner that varies over the course of a data packet session, the flow of packets is often characterized as "bursty." Transmitted packet bursts are interspersed with periods where no packets are transmitted so that the "density" of packets is high for short time periods and often very low for long periods.

It is often desired that mobile communications systems be capable of accommodating both circuit-switched and packet-switched services. It is also typically desired that the limited radio bandwidth be efficiently used. Consequently, different types of radio channels may be employed to more efficiently accommodate different types of traffic to be transported across the radio interface (e.g., the radio interface between cell phones/pagers and corresponding base station(s)).

The Global System for Mobile communications (GSM) is one example of a mobile communications system that offers circuit-switched services via a Mobile Switching Center (MSC) node and packet-switched services via a General Packet Radio Service (GPRS) node. For circuit-switched guaranteed service, dedicated traffic channels are typically employed. A radio channel is dedicated to a particular mobile user and delivers frames of information as received without substantial delay, and typically provides high data throughput. For packet-switched, best effort service, common channels may be employed where plural mobile users share a common channel at the same time. Typically, a common channel delivers packets of information at a relatively low data throughput as compared to a dedicated channel. Thus, when the Quality of Service (QoS) parameter(s) requested is/are relatively high (e.g., for speech or synchronized communication, soft handover, etc.), a dedicated circuit-switched channel may be well suited to handle this kind of traffic. When the quality of service requested is relatively low (e.g., for an e-mail message, or if the user only has a small amount of data to transmit), a common, packet-switched channel may be well suited to handle this kind of traffic. Unfortunately, there is no "switching" between different types of channels in GSM/GPRS. All dedicated traffic is GSM circuit-switched, and all common traffic is GPRS packet-switched.

The selection of the appropriate channel type and channel type switching are desirable features to be included in third generation mobile systems that employ Wideband Code Division Multiple Access (W-CDMA). W-CDMA systems may support a variety of circuit-switched and packet-switched services over a wide range of bit rates, e.g., kilobits per second to megabits per second. Two radio resources in wideband CDMA used to support such services are channelization codes and transmission power. Channelization codes are used to reduce interference and to separate information between different users. The more channel capacity required, the more channelization codes to be allocated. As for transmission power, dedicated channels employ closed loop transmit power control which provides more accurate power assignments resulting in less interference and lower bit error rate. Common channels typically employ open loop power control which is less accurate and not as well suited for transmitting large amounts of data.

Because of the bursty nature of packet data transmissions, congestion-sensitive transmission protocols, QoS parameters, and other dynamic factors of packet data transmissions, the channel-type best suited to efficiently support a user connection often changes during the life of the user connection. At one point, it might be better for the user connection to be supported by a dedicated channel, while at another point it might be better for the user connection to be supported by a common channel. A problem addressed by the present invention is determining if and when to make a channel-type switch during the course of a particular user connection.

One way of determining when to switch a user connection from a dedicated channel to a common channel is to monitor the amount of data currently being stored in a transmission buffer associated with that user connection. When the amount of data stored in the buffer is less than a certain threshold, that smaller amount of data may not justify the use of a dedicated channel. Thus, the connection may be switched to a common channel. On the other hand, the decrease in the amount of data to be transmitted for that user may only be temporary, given the dynamic aspects of data transmission, i.e., the amount of data in the buffer may quickly accumulate because of the load on the common channel or increased capacity needs for the connection. As a result, the connection may need to be switched right back to a dedicated channel.

Consider the situation where a user connection is currently assigned a dedicated radio channel having a higher data transmission rate/capacity than the current incoming rate of the user data to be transmitted over that channel. This situation might arise if there is congestion at some part of the Internet, e.g., Internet congestion causes TCP to dramatically reduce its transmission rate as described above. A slower incoming rate may also be the result of a "weak link" in the connection external to the radio network, e.g., a low speed modem. In such situations, the radio transmit buffer is emptied faster than the data to be transmitted arrives. As a result of the slow incoming data rate, which may only be temporary, the user connection may be switched from the dedicated channel to a common channel, even though soon thereafter the user will have a large amount of data to transmit. Shortly after the user connection is switched to the common channel, the buffer fills up rapidly due to lower throughput on the common channel, and the user connection is switched back to a dedicated channel. These conditions may ultimately result in rapid, prolonged or cyclical switching back and forth between a common channel and a dedicated channel as long as such conditions persist. Such back-and-forth effects are undesirable because each channel type switch consumes power of the battery-operated terminal, loses packets during the switch, and requires additional control signaling overhead. Such back-and-forth switching is especially undesirable in environments where cell load (i.e., the amount of traffic in a particular cell) is low and channel resources are not in high demand.

FIGS. 1–2 illustrate a scenario where, for a given user, undesirable switching back-and-forth between dedicated and common channels is realized. FIG. 1 is a graph simulating a constant 32 kbit/sec incoming data stream to the transmission buffer where the user connection is assigned a dedicated channel with a capacity of 64 kbit/sec. The common channel capacity was simulated at 16 kbit/sec but is illustrated as 0 kbit/sec in FIG. 1. The buffer's channel switch threshold which triggers a switch from dedicated-to-common channel and from common-to-dedicated channel is set at 1,000 bytes (i.e., when it is determined that less than 1,000 bytes are being stored in the buffer, this threshold triggers initiation of a timer whose expiration results in a switch from the dedicated channel to a common channel). An expiration timer may be set, e.g., to one second. FIG. 1 shows the allocated achieved channel capacity (in kbit/sec) plotted against time under these simulated conditions where the user connection is cyclically switched back and forth between a 64 kbps dedicated channel (after about one second) and a common channel (after less than 0.5 seconds).

FIG. 2 shows the buffer amount (in bytes) versus time for this same simulation. The buffer amount is approximately 600 bytes when the user is on the dedicated channel, which is below the threshold of 1,000 bytes. Therefore, the timer runs and upon its expiration the user connection is switched to the common channel. When on the common channel, the transmit buffer is filled very quickly by the 32 kbit/sec incoming stream (the incoming stream comes in at a rate faster than the rate at which data is output on the common channel) up to about 2000 bytes which, because it exceeds the 1000 byte threshold, results in a rapid channel switch back to the dedicated channel. This kind of rapid channel switch cycling is undesirable, as described earlier, because of the resources necessary to orchestrate each channel-type switch and the time required to set up a dedicated channel. Moreover, because traffic on the communications network may change over time, such cyclical switching may be more undesirable in low load conditions than in high load conditions when demand for dedicated channels is high. It is also undesireable for available dedicated or other high throughput channels to be left in a non-used state when they are available.

There may exist points in time when certain areas of the network may have light traffic thereon, while other areas of the network have heavy traffic thereon. In such situations, monitoring of total network traffic/load does not accurately reflect true network conditions. For purposes of example, in a cellular communications network, radio transmissions of each base station (BS) cover a geographical area known as a "cell." Knowing the total load of the entire network does not translate into knowledge of load on a per cell basis. Therefore, many users in a low load cell may be allocated common channels when in reality allocation to them of dedicated channels would not place any undue burden on the network due to the light load in that cell.

In view of the above, it will be apparent to those skilled in the art that there exists a need in the art for a system and corresponding method which enables channel-type switching which takes network conditions and/or cell load(s) into consideration thereby reducing occurrence of any or all of the aforesaid problems in, e.g., low cell load environments. There also exists a need in the art to a system which enables high throughput (e.g., dedicated) channels to be used when they are available.

SUMMARY OF THE INVENTION

Timer timeout values (i.e., timer lengths) and/or buffer thresholds, used in determining if and when to switch from one type of channel to another for a given user, are chosen and/or dynamically adjusted based upon at least the traffic load in a cell in which the user is or has been located.

Data to be transmitted on a channel is stored in a transmit buffer. When the user has a first type of channel, a timer is started when less than a predetermined threshold amount of information is stored in the buffer. If the amount of information stored in the buffer does not exceed or pass above the threshold prior to expiration (or timeout) of the timer, then the user is switched from the first type of channel to a second type of channel. Conversely, when a user has the second type of channel, the user may be switched from the second type of channel to the first type of channel if the amount of information stored in the buffer exceeds a particular threshold. Timeout values of any or all such timers and/or any of these thresholds may be initially set or dynamically adjusted based at least in part upon a measured or estimated parameter such as the amount of cell traffic (i.e., load) in a cell(s) in which the user is (or has been) located. Other parameters and/or conditions may also be taken into account.

In an exemplary embodiment, the present invention may be implemented in a radio network control node having plural buffers, each buffer being assignable to support a mobile user connection and having a corresponding threshold. Channel-type switching circuitry, coupled to the buffers and/or corresponding timers, controllably switches a user connection from a first type of radio channel to a second type of radio channel. A calculator determines timeout values for timer(s). The thresholds and/or timeout values may be determined and/or dynamically adjusted during network operation based at least in part upon estimated or measured load in a cell(s) in which a user of the connection is or has been located. Upon receiving indication of expiration of a timer and/or passing of a threshold, a channel-type switching controller controls the channel-type switching circuitry to direct data corresponding to the mobile user connection stored at one of the buffers from a first type of radio channel (e.g., dedicated channel) currently supporting the mobile user connection to a second type of radio channel (e.g., common channel).

By taking into account the amount of traffic in at least a cell(s) of the user in determining thresholds and/or timer timeout values, actual network conditions are taken into account. For example, high throughput channels such as dedicated channels may be utilized when available. Moreover, unnecessary switching may be avoided or reduced when the amount of traffic in the cell(s) is low and plenty of channel resources are available. In other words, when there is little traffic in a particular cell, it may be beneficial to allow many or all users in that cell to use respective dedicated channels since there is no excess demand for the same. However, when there is substantial traffic in the cell, thresholds and/or timeout values may be adjusted to restrict dedicated channels to those users truly in need of them. Thus, rapid back-and-forth switching of a user from one type of channel to another may be avoided when not necessary. As an example, for increasing cell loads timer length(s) may be decreased in the context of determining when to switch from a dedicated channel to a common channel. Conversely, for decreasing cell loads timer length (s) may be increased in the context of determining when to switch from a dedicated channel to a common channel. The opposite may be true in the case of timer values utilized in determining when to switch from a common channel to a dedicated channel. This enables the system to conserve resources and overhead, and better reflect actual network conditions.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate that these functions may be performed by individual hardware circuits, by a suitably programmed digital microprocessor or general purpose computer, by an application specific integrated circuit (ASIC), and/or by one or more digital signaling processes (DSPs).

FIG. 3(a) is a flowchart diagram illustrating a channel-type switching method in accordance with one example embodiment of the present invention;

FIG. 3(b) is a block diagram illustrating a channel-type switching system in accordance with one example embodiment of the present invention;

DETAILED DESCRIPTION OF THE DRAWINGS

Figure 1:
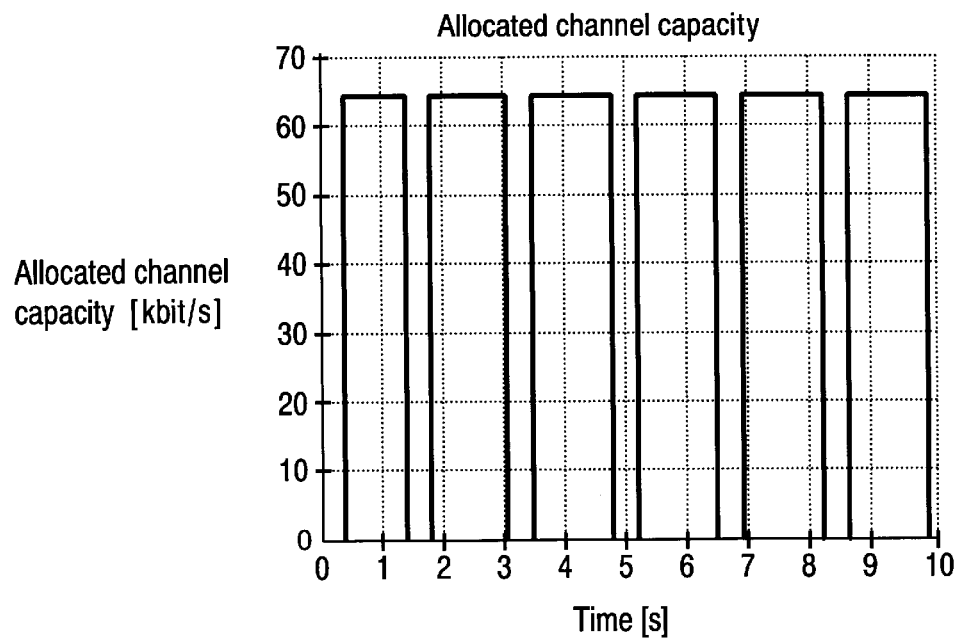
FIG. 1 is a graph illustrating allocated channel capacity versus time in a simulated channel switching scenario.
Figure 2:
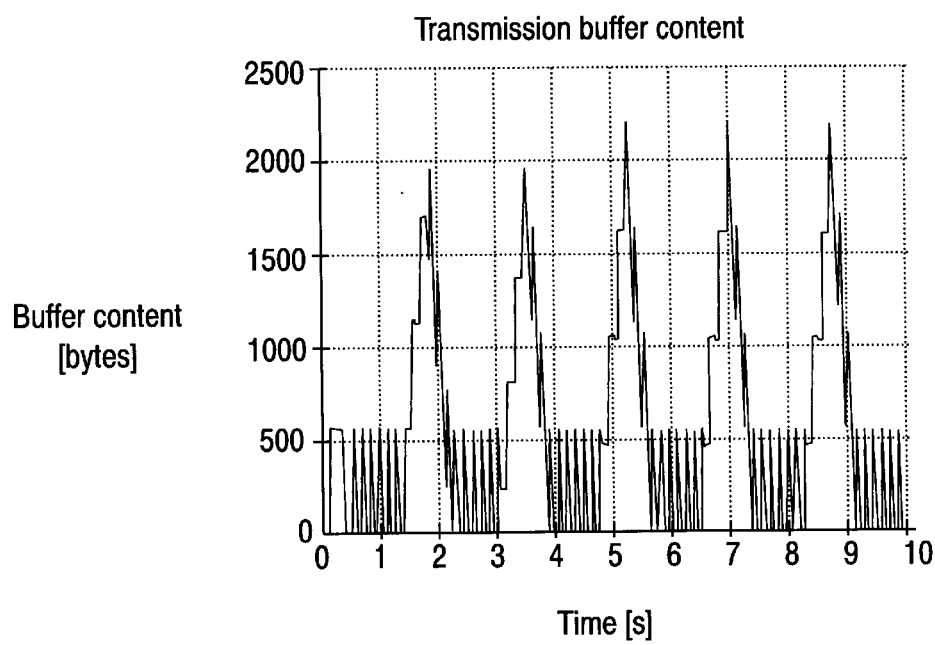
FIG. 2 is a graph illustrating transmission buffer content versus time in the simulated scenario of FIG. 1.

In the following description, for purposes of explanation and not limitation, specific details are set forth, such as particular embodiments, network architectures, signaling flows, protocols, techniques, etc., in order to provide an understanding of the present invention. However, it will be apparent to one skilled in the art that the present invention may be practiced in other embodiments that depart from these specific details. For example, while the present invention is disclosed in the example context of channel-type switching to/from a dedicated type of channel from/to a common or shared type of channel, those skilled in the art will appreciate the present invention can be applied to other types of channel switching situations including for example switching from another type of channel, such as a second common channel, to the first common channel, etc. However, to simplify the description, reference is made to switching from a dedicated channel to a common channel, and vice versa. Moreover, although the present invention is disclosed in the example context of mobile radio WCDMA communications, it may also be employed in any type of communications system where channel-type switching may be employed. In other instances, detailed descriptions of well-known methods, interfaces, devices, protocols, and signaling techniques are omitted so as not to obscure the description of the present invention with unnecessary detail.

Data to be transmitted on a channel is stored in a transmit buffer. Such buffers (e.g., radio link control (RLC) buffers) may be provided at a mobile station (MS), a base station (BS), and/or a radio network controller (RNC). For example, for uplink radio communications from a MS to a BS, RLC buffers may be provided at the MS; while for downlink radio communications from a RNC or BS to a MS, RLC buffers may be provided at the BS and/or RNC.

When the user (or user's MS) is supported by a first type (e.g., dedicated) of radio channel, a timer is started when less than a threshold amount of information is stored in the buffer corresponding to that user or MS. If the amount of information stored in the buffer does not exceed or pass above that buffer threshold prior to expiration (or timeout) of the timer, then the user is switched from the first type of channel to a second type (e.g., common) of channel. Conversely, when a user (or user's MS) is supported by a common type channel, the user may be switched from the common type of channel to a dedicated type of channel if the amount of information stored in the buffer exceeds a particular threshold (optionally, a timer may also be used to determine whether the threshold is exceeded for a particular amount of time, after which switching automatically occurs). In different embodiments of this invention, a connection may start with a user's MS being supported by a common type of channel, or alternatively may start with the user's MS being supported by a dedicated type of channel.

A general description of the present invention is now provided with reference to the channel-type switching system and method of this invention in the context of FIGS. 3(a) and 3(b). In FIG. 3(b), illustrated are cell load detector or calculator 190, time-out timer 220, channel switch controller 212, and channel type switches (CTSs) 206–210. The method (block 4) is illustrated in function block format in FIG. 3(a). This method may be implemented in any type of communications system (including both wired and wireless)

where a user connection may be switched to/from different types of channels.

Referring to FIG. 3(a), a communications channel allocation entity provides a first type of communications channel (e.g., dedicated channel) to support a user connection during operation of the network (block 5). One or more parameters that affect the decision to switch the user connection from the first type of channel to a second type of channel are detected ("detected" and "determined" as used herein in this regard include measured, calculated, and estimated values) (block 6), e.g., cell(s) load and/or QoS. In the illustrated embodiment, the parameter(s) include at least the amount of traffic in at least one cell (i.e., cell load) in which the user (or mobile station MS) is, or has recently been, located. In different embodiments of this invention, cell load may be determined (i.e., cell load may be measured, estimated, or calculated) in (i) only the cell(s) in which the user MS is located, (ii) the cell(s) in which the user MS is currently located as well as any other cell(s) in which the user MS was previously located within a predetermined period of time, or (iii) the cell(s) in which the user MS is located and all cells immediately adjacent thereto (or overlapping therewith). Technique (iii) above would enable the system to avoid unnecessary overload in adjacent cells.

Upon evaluating the determined cell load for the cell(s) at issue (block 6), timer timeout values (i.e., timer lengths) and/or buffer thresholds are set or dynamically adjusted during network operation based at least in part upon the determined cell load (block 7). In certain embodiments, only the timer timeout values are set or dynamically adjusted based at least in part upon the determined cell load. In other embodiments, only the buffer thresholds which may or may not indicate whether to begin running of a timer are set or dynamically adjusted based at least in part upon the determined cell load. In still further embodiments, both timer timeout values and corresponding buffer thresholds are set or dynamically adjusted based at least in part upon the determined cell load.

For example, for increasing cell load(s) timer length(s) may be decreased in the context of determining when to switch from a dedicated channel to a common channel (i.e., only those users who truly need or require dedicated channels at given points in time are supported by such channels). Conversely, for decreasing cell load(s) timer length(s) may be increased in the context of determining when to switch from a dedicated channel to a common channel (this allows more users to take advantage of dedicated channels during low load periods).

Whether to switch from a common channel to a dedicated channel may be determined based upon whether the amount of information stored in a transmit buffer of the user connection exceeds a particular threshold. Optionally, the switch may be thrown once that threshold has been exceeded for a particular period of time as indicated by expiration of a timer. For example, for decreasing cell load(s), buffer threshold(s) and/or timer timeout values may be decreased in the context of determining when to switch from a common channel to a dedicated channel (this allows more users to be switched from common channels to dedicated channels in order to take advantage of dedicated channels during low load periods). Thus, when low cell load(s) is/are detected, the buffer threshold(s) may be decreased from X bytes to X-Y bytes, so that switching occurs or a timer begins to run once the amount of information stored in the corresponding buffer exceeds X-Y bytes, as opposed to a greater amount such as X bytes. Conversely, for increasing cell load(s), buffer threshold(s) and/or timer values may be increased in the context of determining when to switch from a common channel to a dedicated channel (only those users who truly need or require dedicated channels at given points in time are supported by such a channel in higher load condition in a given cell(s)).

After the timeout value(s) and/or buffer threshold(s) have been dynamically adjusted based at least in part upon cell load (other factors such as QoS may also be taken into consideration) in block 6, the channel switching decision is controlled based at least in part upon timeout value(s) of the respective timer(s) and/or the whether buffer threshold(s) have been passed so that undesirable channel-type switching is reduced (block 8). This control operation prevents or reduces inefficient, excessive, or rapid cyclic switching of the user connection between the first and second channel-types, especially when the user's cell(s) is in a low load condition. As a result, increased performance can be provided to additional users in low load cells without adversely impacting the efficient use of resources.

Figure 5:
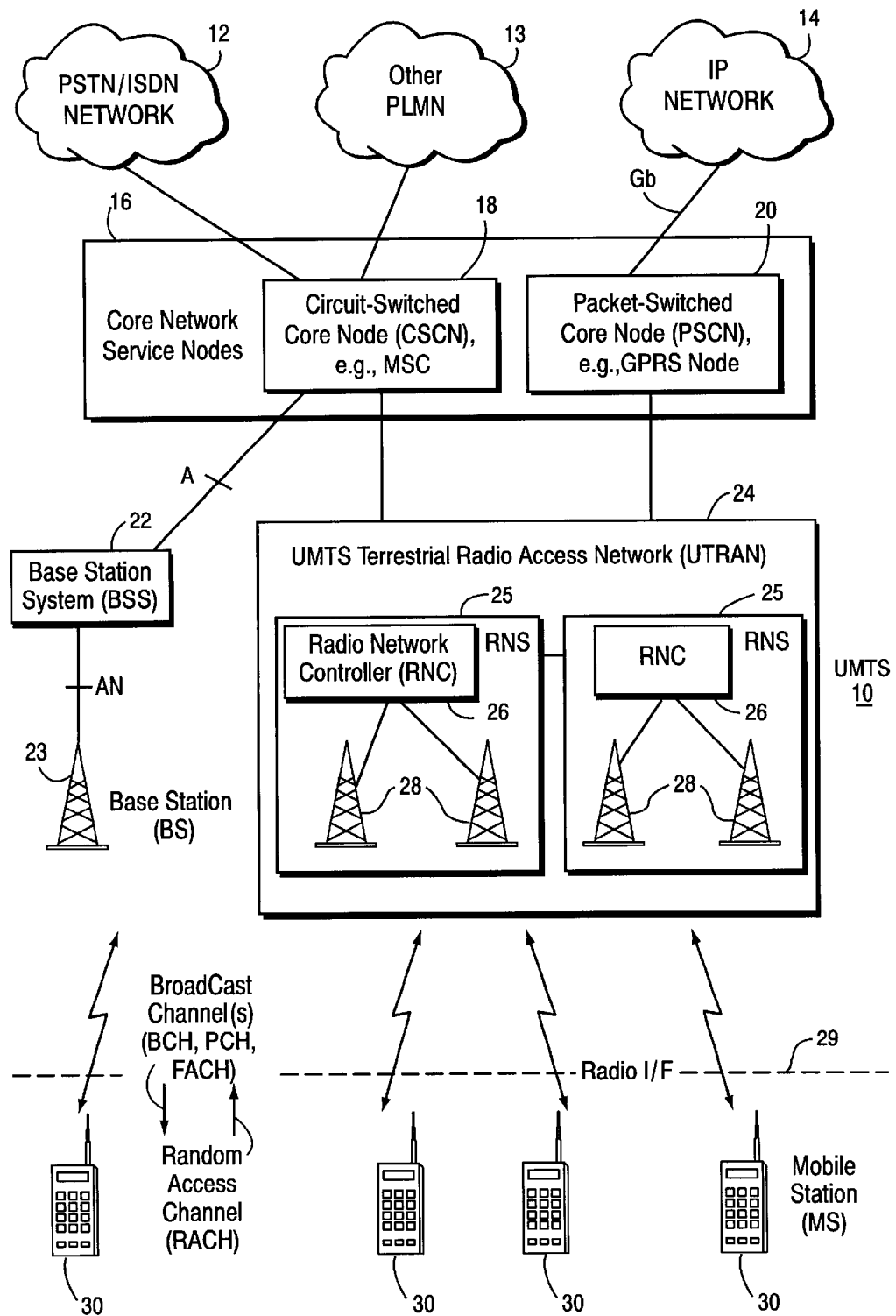
FIG. 5 is a function block diagram illustrating a Universal Mobile Telephone System (UMTS) in which the present invention may be employed.

One advantageous application of the present invention is now described in the non-limiting, example context of a universal mobile telecommunications system (UMTS) 10 shown in FIG. 5. A representative, circuit-switched, external core network 12 may be, for example, the public switched telephone network (PSTN) and/or the integrated services digital network (ISDN). Another circuit-switched, external core network may correspond to another Public Land Mobile radio Network (PLMN) 13. A representative, packet-switched, external core network 14 may be, for example, an IP network such as the Internet. The core networks are coupled to corresponding network service nodes 16. The PSTN/ISDN network 12 and other PLMN network 13 are connected to a circuit-switched core node (CSCN) 18, such as a Mobile Switching Center (MSC), that provides circuit-switched services. The UMTS 10 may co-exist with an existing cellular network, such as the Global System for Mobile Communications (GSM), where the MSC 18 is connected over an interface A to a base station subsystem (BSS) 22 which in turn is connected to radio base station(s) 23 over an interface AN.

The packet-switched network 14 is connected over interface Gb to a packet-switched core node (PSCN), e.g., a General Packet Radio Service (GPRS) node 20 tailored to provide packet-switched type services in the context of GSM which is sometimes referred to as the Serving GPRS Service Node (SGSN). Each of the core network service nodes 18 and 20 also connects to UMTS terrestrial radio access network (UTRAN) 24 over a radio access network interface. The UTRAN 24 includes one or more radio network systems (RNS) 25 each with a radio network controller (RNC) 26 coupled to a plurality of base stations (BS) 28 and to the RNCs in the UTRAN 24.

Preferably, radio access over radio interface ("Radio I/F") 29 is based upon wideband Code Division Multiple Access (WCDMA) with individual radio channels allocated using CDMA channelization or spreading codes. Of course, other access methods may be employed, such as TDMA. WCDMA provides wide bandwidth for multimedia services and other high transmission rate demands as well as robust features like diversity handoff to ensure high quality communication service in frequently changing environments. Each mobile station (MS) 30 is assigned its own scrambling code in order for a base station 23, 28 to identify transmissions from that particular mobile station 30. Each mobile station 30 also uses its own scrambling code to identify transmissions from the base station either on a general broadcast or common channel or transmissions specifically intended for that mobile station. That scrambling code distinguishes the scrambled signal from other transmissions and noise present in the same area.

User MS units 30 communicate with base stations 28 over interface 29, e.g., using common and/or dedicated radio channels. Moreover, different types of control channels are shown bridging radio interface 29. For example, in the forward or downlink direction, there are several types of broadcast channels including a general broadcast channel (BCH), a paging channel (PCH), and a forward access channel (FACH) for providing various types of control messages to mobile stations. In the reverse or uplink direction, a random access channel (RACH) is employed by mobile stations whenever access is desired to perform location registration, call origination, page response, and other types of access operations.

Figure 4:
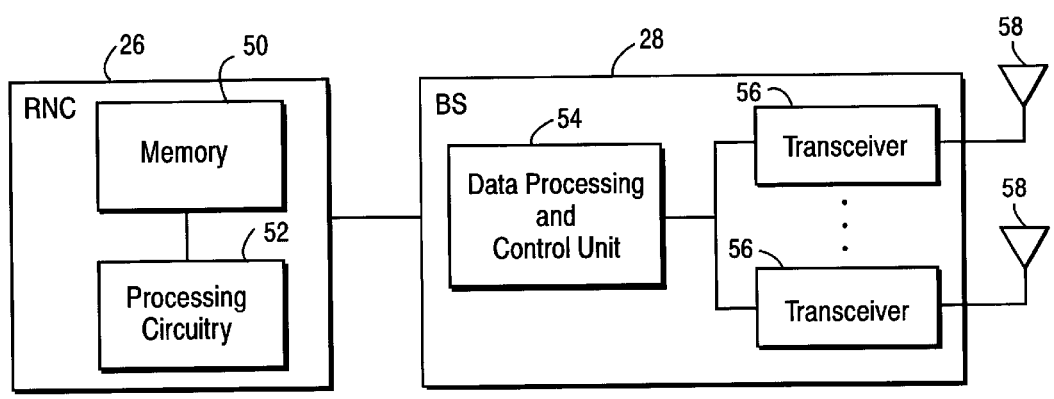
FIG. 4 is a functional block diagram of a radio network controller and a base station, of the types shown in FIG. 5.

Simplified functional block diagrams of an exemplary radio network controller (RNC) 26 and base station (BS) 28 are shown in FIG. 4. The radio network controller (RNC) 26 includes memory 50 coupled to data processing circuitry 52 that performs numerous radio and data processing operations required to perform its control function and conduct communications between the RNC and other entities such as the core network service nodes, other RNCs, and base stations 28. Data processing circuitry 52 may include any one or a combination of suitably programmed or configured general purpose computer, microprocessor, microcontroller, dedicated logic circuitry, DSP, ASIC, etc. Channel switching logic, as well as measurement controlling functions and capacity management functions (see FIGS. 11–12) may also be provided in circuitry 52.

Figure 6:
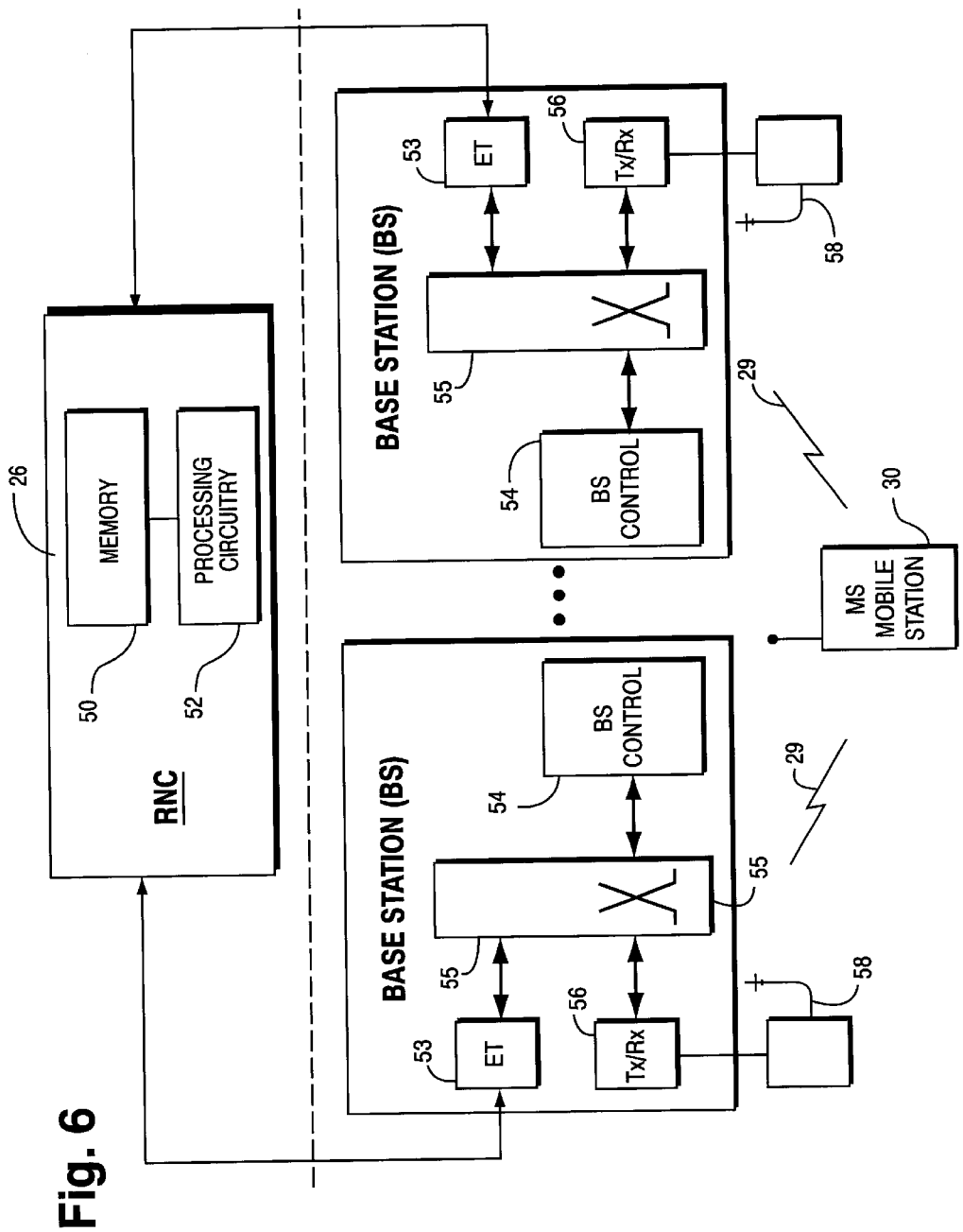
FIG. 6 is a functional block diagram of a pair of base stations in communication with an RNC, in accordance with the FIG. 5 embodiment.
Figure 7:
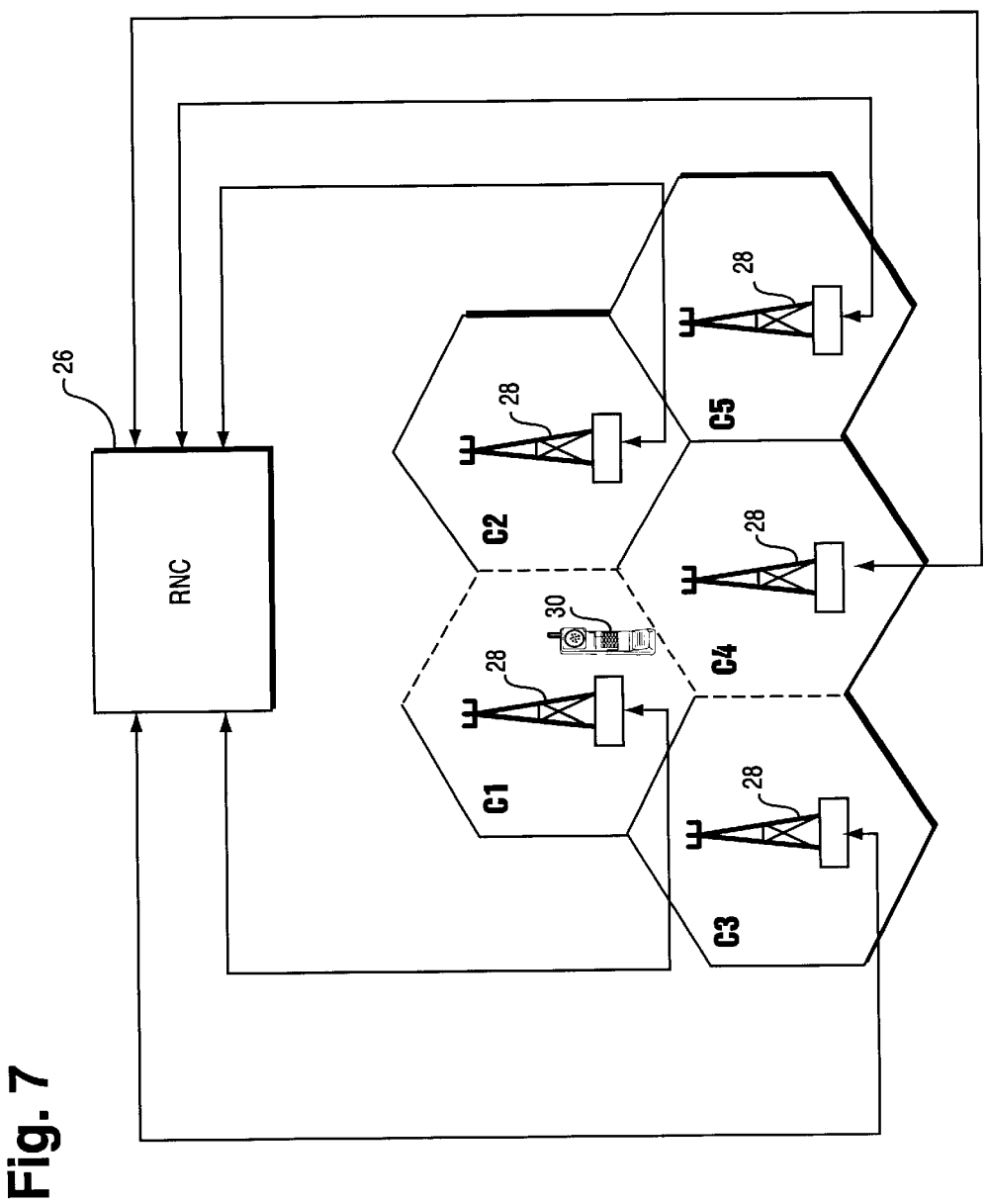
FIG. 7 illustrates each base station of the FIG. 5 embodiment defining its own cell.

Referring to FIGS. 4 and 6–7, radio transmissions of each base station 28 cover a geographical area known as a "cell." A plurality of such base stations 28 and the corresponding cells C1–C5 which they define are shown in FIG. 7. Each base station 28 may be of the single sector type, or the multiple sector type, as known in the art. Referring to FIGS. 4 and 6, each base station 28 includes a data processing and control unit 54 which, in addition to performing processing operations relating to communications with RNC 26, may perform a number of measurement and control operations (e.g., cell load measurements) associated with base station radio equipment including transceivers 56 connected to one or more antennas 58. Stations 28 may be ATM (asynchronous transfer mode) based in certain embodiments, so that in each base station the control unit 54, transceiver 56 and exchange terminals 53 are interconnected via an ATM switch core 55, as illustrated in FIG. 6.

The data processing and control unit 54 of a particular base station 28 may measure the load in the cell "C" defined by that base station. Cell load may be measured by (a) total downlink (DL) power emitted at a given point in time by the transmitter 56, 58 of the base station, and/or (b) the total uplink (UL) power received by that base station from mobile stations 30 at the given point in time. The total UL power received by a base station 28 includes WCDMA signals received from both mobile stations 30 in the cell of that base station, as well as signals received from mobile stations 30 in adjacent cells. Each of (a) and (b) are preferably measured by unit 54 in the analog domain, although in alternative embodiments they may be measured in the digital domain provided that additional gain information is known as will be appreciated by those skilled in the art. For example, total DL power (a) may be measured at the multi-carrier power amplifier (MCPA) which functions to control gain in the base station. The cell load information, including total DL power (a) and/or total UL power (b), is transmitted by unit 54 and from the base station 28 at issue to the appropriate RNC 26 so that the RNC can utilize (a) and/or (b) in order to dynamically adjust timeout values and/or thresholds used in determining when to switch from one channel type to another channel type.

In certain embodiments, the RNC may use only total DL power (a) or only total UL power (b) in determining how much to adjust timeout values and/or buffer thresholds. In other embodiments, the RNC may combine (a) and (b) in determining how to adjust timeout values and/or buffer thresholds. In still further embodiments, the RNC may use one of (a) and (b) to determine how to adjust timeout value(s) indicative of when to switch from a dedicated channel to a common channel for a given user, and may use the other of (a) and (b) to determine how to adjust buffer threshold(s) indicative of when to switch from a common channel to a dedicated channel for a given user.

Figure 8:
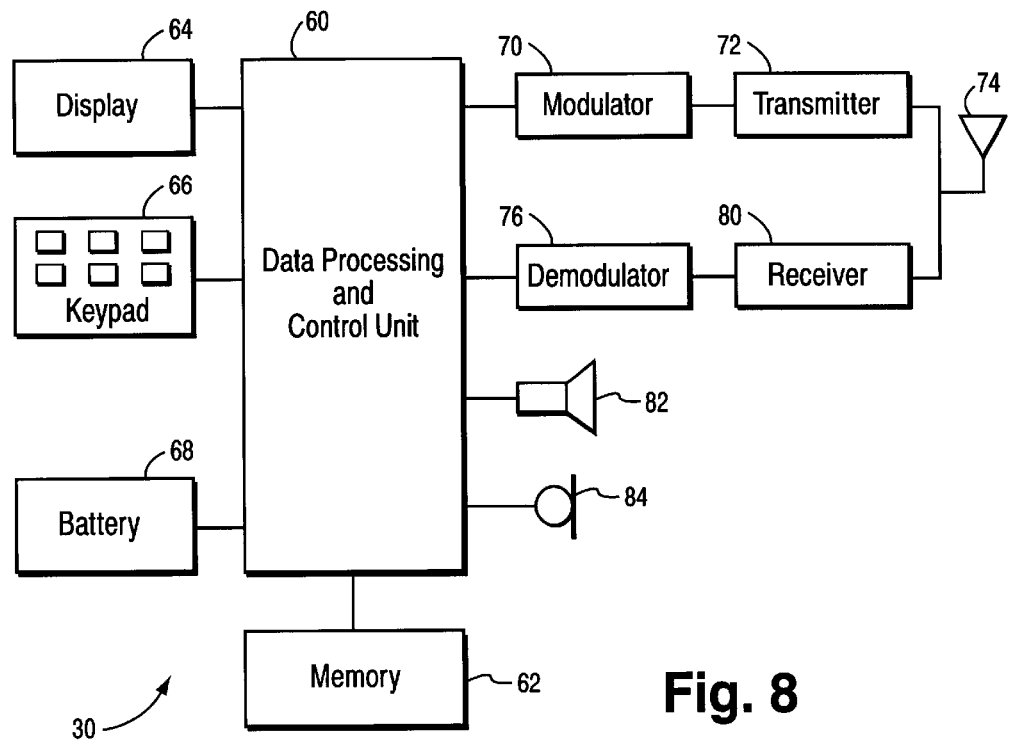
FIG. 8 is a function block diagram of a mobile station, in accordance with the FIG. 5 embodiment.

A simplified function block diagram of an exemplary mobile station 30 is shown in FIG. 8. Mobile station 30 includes antenna 74 for transmitting signals to and for receiving signals from a base station 28 over radio interface 29. Antenna 74 is coupled to radio transceiving circuitry including modulator 70 coupled to transmitter 72 and demodulator 76 coupled to receiver 80. The radio transceived signals include signaling information in accordance with an air interface standard applicable to wideband CDMA in certain embodiments. Data processing and control unit 60 and memory 62 include the circuitry required for implementing audio, logic, and control functions of the mobile station. Memory 62 stores both programs and data. RLC buffers (e.g., see FIG. 13) for storing data to be transmitted on dedicated or common channels may be provided in memory 62. Conventional speaker or earphone 82, microphone 84, keypad 66, and display 64 are coupled to data processing and control unit 60 to make up the user interface. Battery 68 may be used to power the various circuits required to operate mobile station 30.

Figure 9:
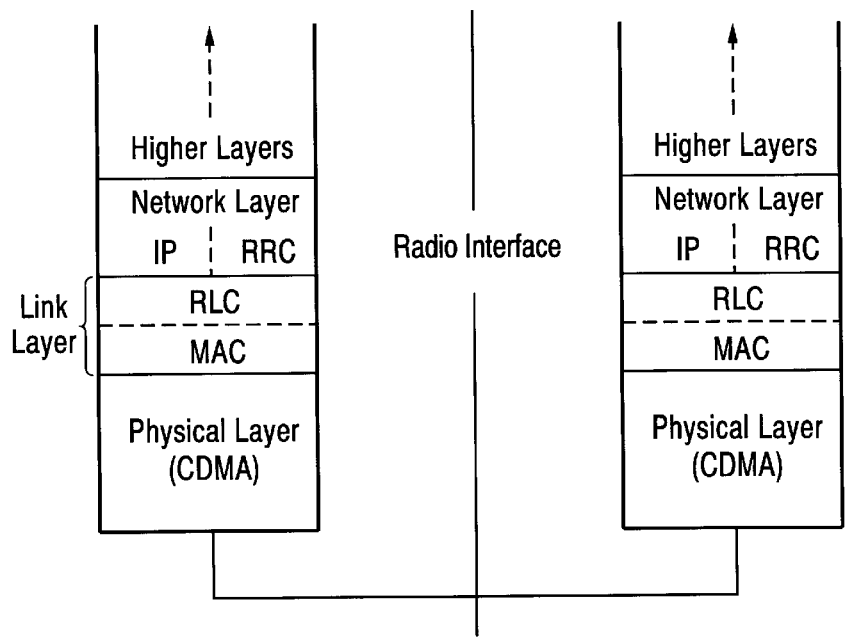
FIG. 9 is a diagram illustrating transmission protocol layers that may be employed in the UMTS system shown in FIG. 5.

Radio interface 29 is divided into several protocol layers with several lower level layers as illustrated in FIG. 9. In particular, a mobile station 30 uses these protocol layers to communicate with similar protocol layers in the UTRAN. Both protocol stacks include: a physical layer, a data link layer, a network layer, and higher layers. The data link layer is split into two sublayers: a radio link control (RLC) layer and medium access control (MAC) layer. The network layer is divided in this example into a control plane protocol (RRC) and a user plane protocol (IP). The medium access control (MAC) layer provides unacknowledged transfer of service data units (SDUs) between peer MAC entities. The MAC functions include selecting an appropriate transport format for each transport channel depending on data rate, priority handling between data flows of one user and between data flows of different users, scheduling of control messages, multiplexing and demultiplexing of higher layer PDUs, and other functions. The RLC performs various functions including the establishment, release, and maintenance of an RLC connection, segmentation and reassembly of variable length, higher layer PDUs into/from smaller RLC PDUs, concatenation, error correction by retransmission (ARQ), in sequence delivery of higher layer PDUs, duplicate detection, flow control, and other functions. The transmit buffers assigned to mobile user connections are controlled at the RLC layer, both at the mobile stations and at the base stations and/or RNCs.

Figure 10A:
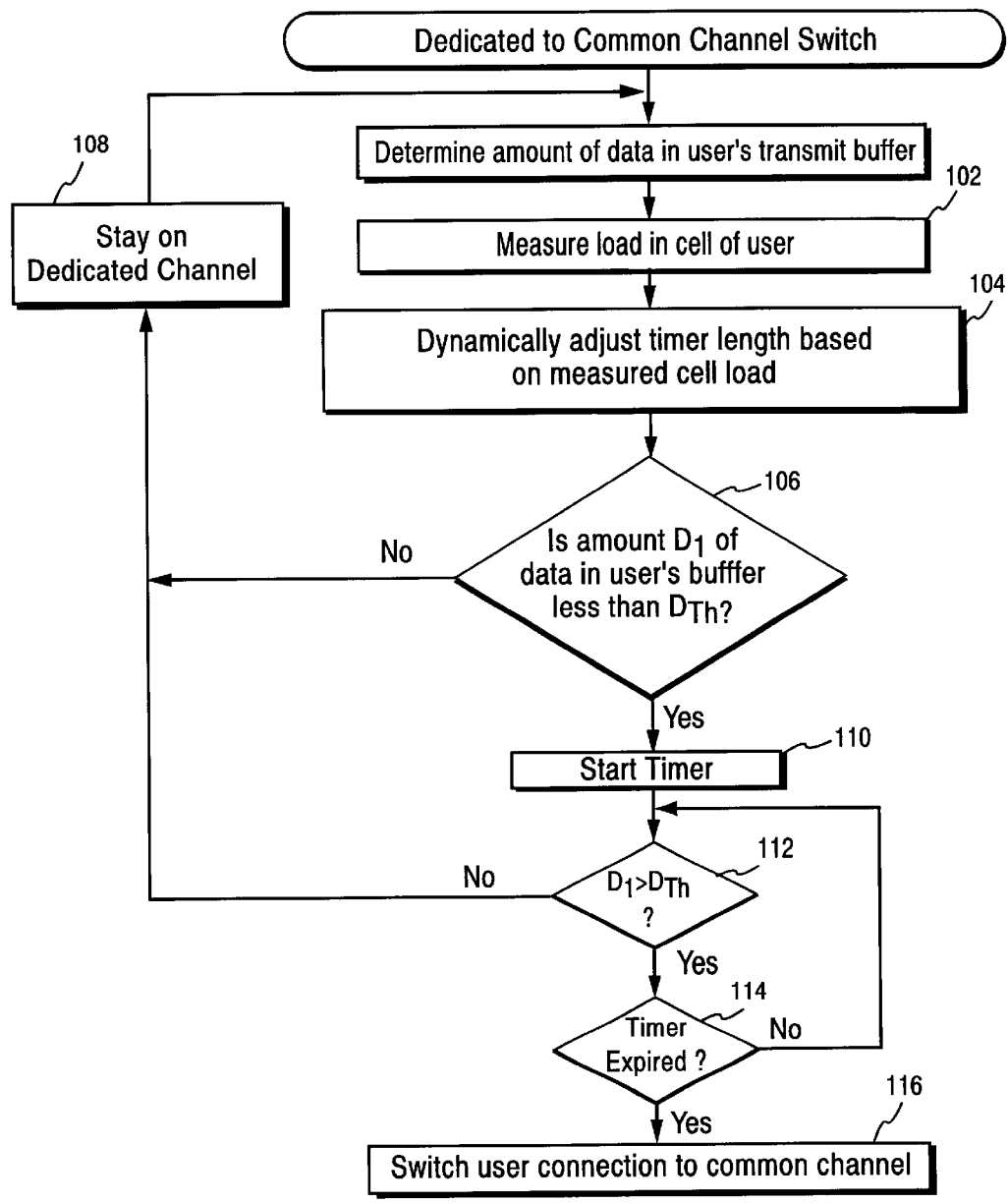
FIG. 10a is a flow chart illustrating steps taken according to an embodiment of this invention in switching a user connection from a dedicated channel to a common channel.

FIG. 10a illustrates a first non-limiting exemplary application of the invention in the context of a dedicated-to-common channel-type switching routine where the mobile user connection is currently being supported by a dedicated type of radio channel and is considered for switching down to a common type of radio channel. As indicated above, this routine may be applied to channel-type switches from any higher capacity or QoS channel to a lower capacity or QoS channel; however, dedicated-to-common channel type switch is used as an illustration. "Switch down" means switching from a dedicated type of radio channel (or other higher capacity or quality channel) to a common type of radio channel (or other lower capacity or quality channel) typically because there is not enough data in the user connection to justify use of the dedicated channel (or other higher capacity or quality channel) for that user connection. "Switch-up" refers to switching in the opposite direction from a common to a dedicated channel.

Still referring to FIG. 10a, the amount of data D1 stored in the transmit buffer (e.g., in an RLC buffer at the RNC, BS, or MS) is determined at 100. In step 102, the load of the applicable cell (i.e., any or all of the cells described above in any of (i) through (iii)) is measured or estimated by the BS controller 54. The measured or estimated load data is forwarded from the applicable base station(s) to the RNC. In step 104, at the RNC a calculation function utilizes the cell load data relating to the user in order to dynamically adjust a timer timeout value T based at least in part upon the determined cell load. Other factors (e.g., QoS, priority, etc.) may also be taken into account in determining T in certain embodiments of this invention. For purposes of example only, timeout value T may be adjusted and set to values ranging from about 0.5 to 5.0 seconds depending upon the determined cell load. Thereafter, it is determined in step 106 whether the amount of data (D1) in the user's transmit buffer is less than a threshold amount Dth (in different embodiments, Dth may or may not be set or adjusted based upon cell load). If not, then the user stays on the dedicated channel 108 and steps 100–106 are repeated. If so, then the timer with timeout value T is started in step 110. It is again determined in step 112 whether D1 is less than buffer threshold amount Dth. If not, then the user stays on the dedicated channel (i.e., the amount of data in the buffer increased from below Dth to above Dth in the time since the timer was started) and no switching occurs. However, if D1 is still below Dth in step 112, then it is determined in step 114 whether the timer has expired (i.e., has the timer reached time T?). If not, then steps 112 and 114 are repeated. If so, then in step 116 the user is switched from the dedicated channel to a common channel. While the actual switching may take place in the MS 30 or a BS 28 in certain embodiments, the RNC preferably determines when to make a switch and instructs the MS 30 and/or BS 28 accordingly.

Figure 10B:
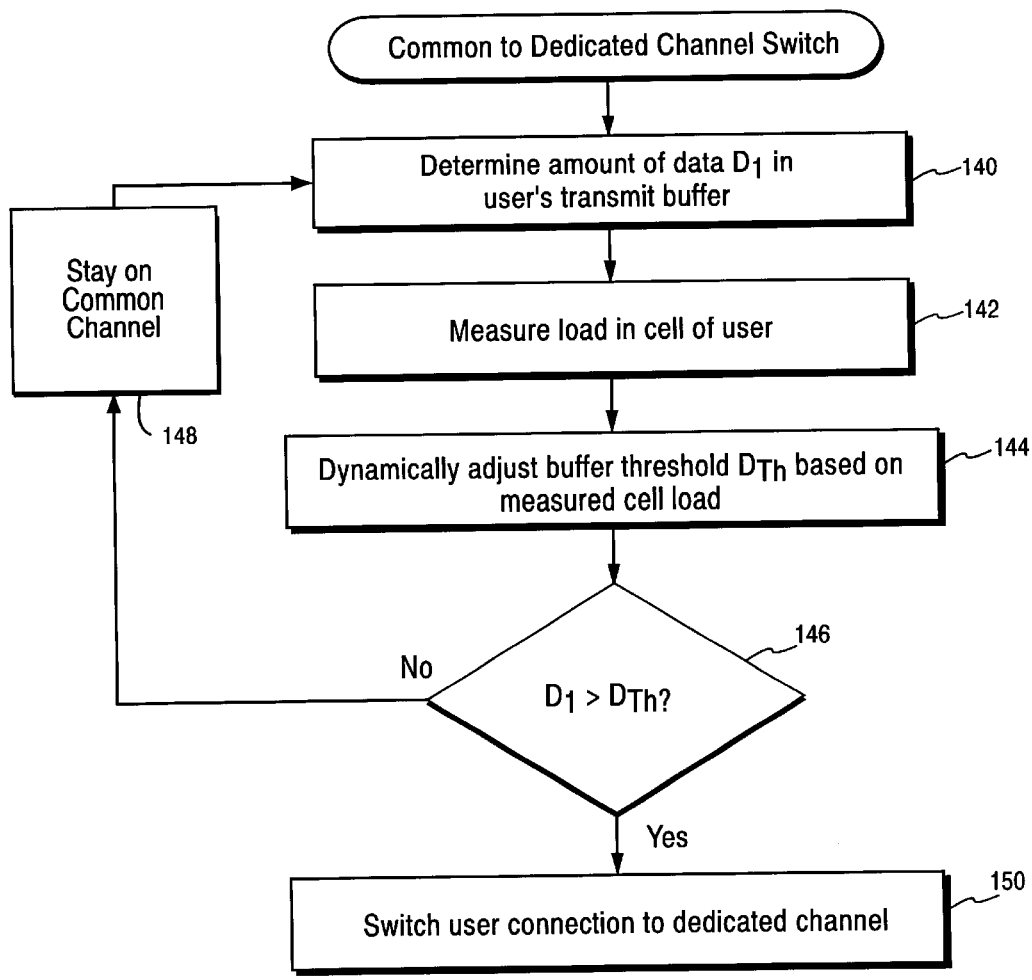
FIG. 10b is a flow chart illustrating steps taken according to an embodiment of this invention in switching a user connection from a common channel to a dedicated channel.

FIG. 10b illustrates a first non-limiting exemplary application of the invention in the context of a common-to-dedicated channel-type switching routine where the mobile user connection is currently being supported by a common type of radio channel and is considered for switching up to a dedicated type of radio channel. The amount of data D1 stored in the transmit buffer (e.g., in an RLC buffer at the RNC, BS, or MS) is determined at 140. In step 142, the load of the applicable cell (i.e., any or all of the cell(s) described above in any of (i) through (iii)) is measured or estimated by the BS controller 54. The measured or estimated load data is forwarded from the applicable base station(s) to the RNC. In step 144, at the RNC a calculation function utilizes the determined cell load relating to the user in order to dynamically adjust a buffer threshold Dth based at least in part upon the determined cell load. Other factors (e.g., QoS, priority, etc.) may also be taken into account in determining Dth in certain embodiments of this invention. For purposes of example only, the buffer threshold Dth may be set or adjusted in the range of 200 to 2,000 bytes depending upon the cell load. Thereafter, it is determined in step 146 whether the amount of data (D1) in the user's transmit buffer is greater than buffer threshold Dth. If not, then the user stays on the common channel at 148 and steps 140–146 are repeated. If so, then the user's (or MS 30's) connection is switched from the common channel to a dedicated channel in step 150. As mentioned above, while the actual switching may take place in the MS 30 or a BS 28, the RNC preferably determines when to make a switch and instructs the MS 30 and/or BS 28 accordingly.

Figure 11:
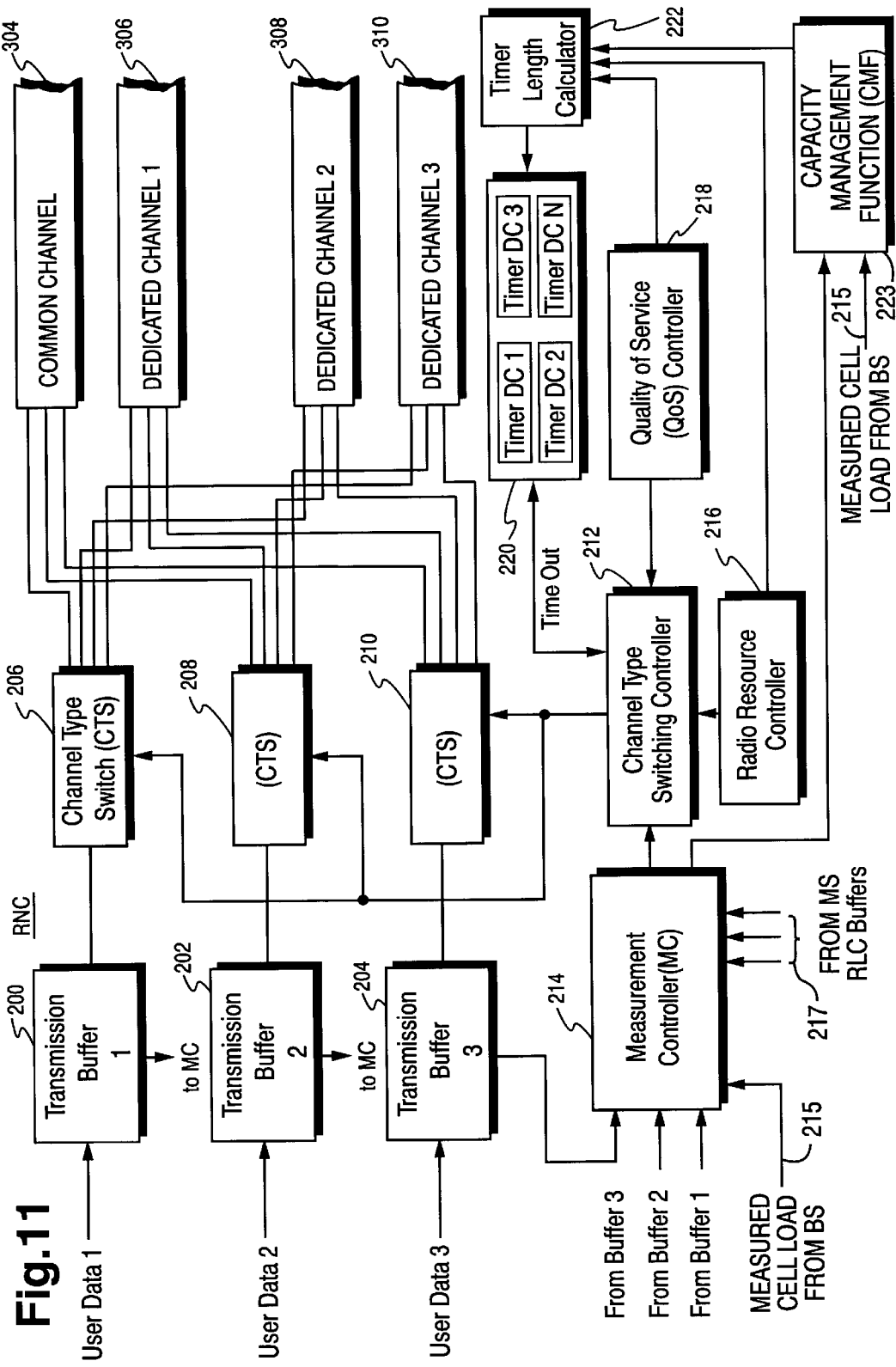
FIG. 11 is a functional block diagram illustrating a first example implementation of the present invention in a radio network controller of FIG. 5.

FIG. 11 illustrates an example implementation of the present invention as implemented in a radio network controller (RNC) which is in communication with a plurality of base stations 28. At least one such base station defines a cell in which the user's MS 30 is, or has recently been, located. That cell(s) will be the subject of load measurements or estimates in this particular example. As illustrated, three user data connections 1, 2, and 3 are coupled to respective transmission buffers 1–3 (200–204), e.g., RLC buffers located at the RNC (or a BS). The respective user data is received by the transmission buffers 200–204 from the core network. The amount of data D1 currently stored in each of the three transmission buffers (each buffer corresponds to a particular user of MS 30) is provided to measurement controller (MC) 214. Measurement controller 214 also receives load cell estimates or measurements 215 from applicable base station(s) 28, as well as measurements or estimates 217 from applicable base stations indicating the byte content of respective transmission buffers 300 (see FIG. 13) in respective mobile stations 30. Thus, controller 214 is able to compare buffer amounts from both MS buffers and RNC/BS buffers 200–204 with buffer thresholds as described herein. Each transmission buffer 200–204 is coupled to a corresponding channel-type switch (CTS) 206, 208, and 210 that may be implemented for example at the MAC layer. Each of the channel-type switches is controlled by a channel-type switching controller 212 which receives measurement inputs from measurement controller 214, and if desired, inputs from respective timers 220, radio resource controller 216, and/or Quality of Service controller 218. Switching controller 212 may cause switching to be performed at an RNC or BS as shown in FIG. 11, and/or may communicate with a MS through a corresponding BS in order to cause channel switching to actually be performed at the MS.

Each dedicated channel is associated with an expiration timer, e.g., timer DC1-timer DCN, at 220. A timer length calculator 222 and/or capacity management function 223 determine the expiration length T for each timer based at least in part upon determined cell load data 215 received from the base relevant base station(s). Capacity management function 223 and calculator 222 may be separate units, or may be combined in different embodiments of this invention. Moreover, function 223 and/or calculator 222 may take other factors into account when adjusting T of each timer, such as available radio resources from radio resource controller 216 and/or QoS requirements for the user connection received from QoS controller 218. In such a manner, function 223 and/or calculator 222 continuously update or adjust the timeout value T for each timer DC1–DCN as additional cell load information is received during the course of network operation. Controller 214 may also continuously update or adjust buffer threshold(s) for transmit buffers 200–204, 300, for respective channels, as cell load information is received during the course of, network operation. Thus, the timeout value T for a particular user connection may vary over a wide range of values during the course of a single cellular telephone conversation that the user is having with another on the network. Thus, timeout values T and/or buffer thresholds associated with connections in one cell may be different than timeout values T and/or buffer thresholds associated with connections in other cells.

Figure 12:
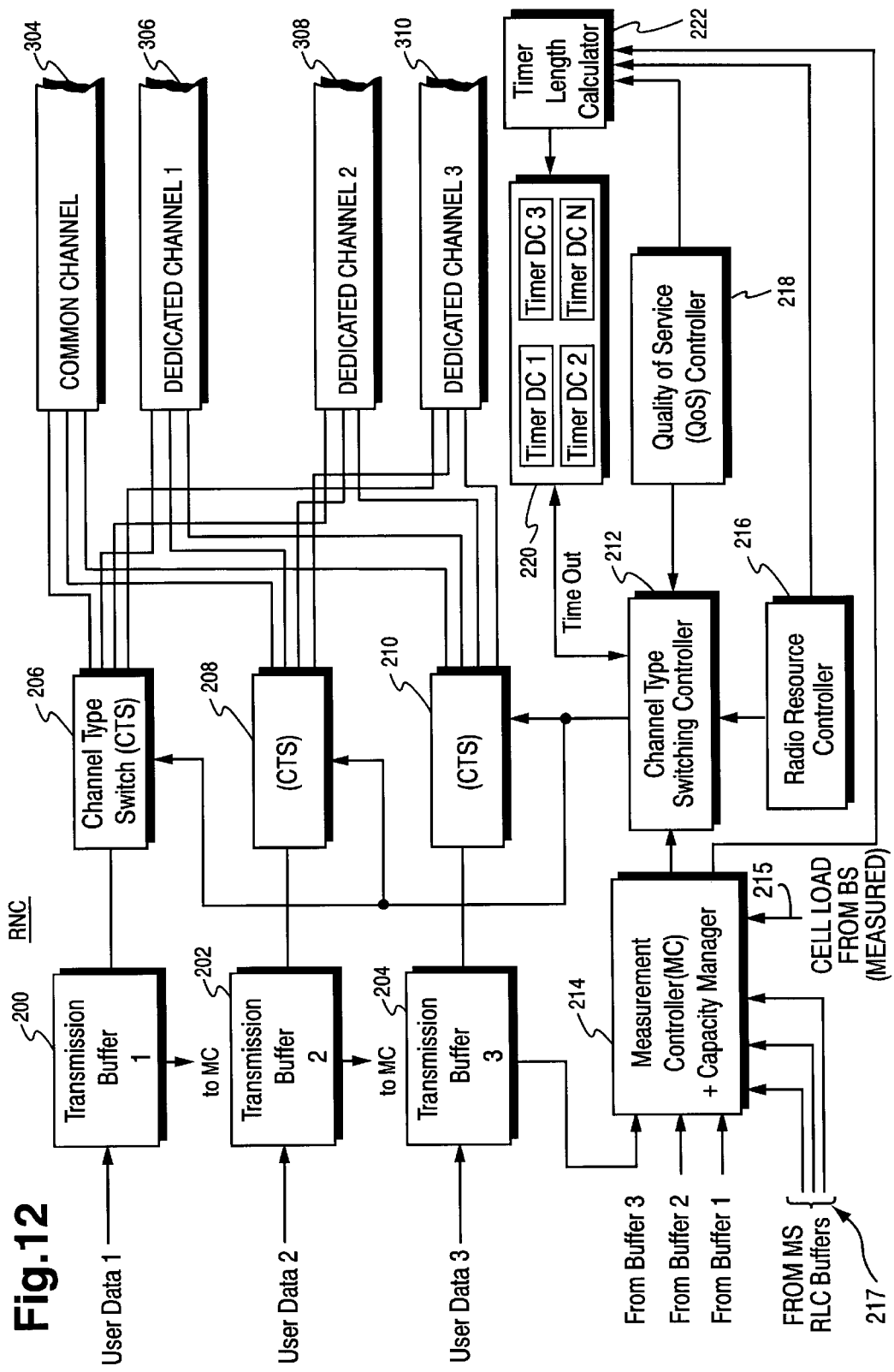
FIG. 12 is a functional block diagram illustrating a second example implementation of the present invention in a radio network controller of FIG. 5.

FIG. 12 illustrates another embodiment of this invention which differs from the FIG. 11 embodiment in that the capacity management function is integrated with measurement controller 214. Thus, controller 214 performs the functions of receiving determined cell load data from respective base stations, receiving buffer content data from both RNC transmit buffers 200–204 and MS buffer 300, and calculating to what values buffer thresholds and/or timer timeout values T are to be set in view of the incoming cell load data.

In FIGS. 11–12, many of the functions of the invention are performed in the RNC (or some other radio network node). Accordingly, mobile stations 30 need only support the RNC with information and follow instructions.

Figure 13:
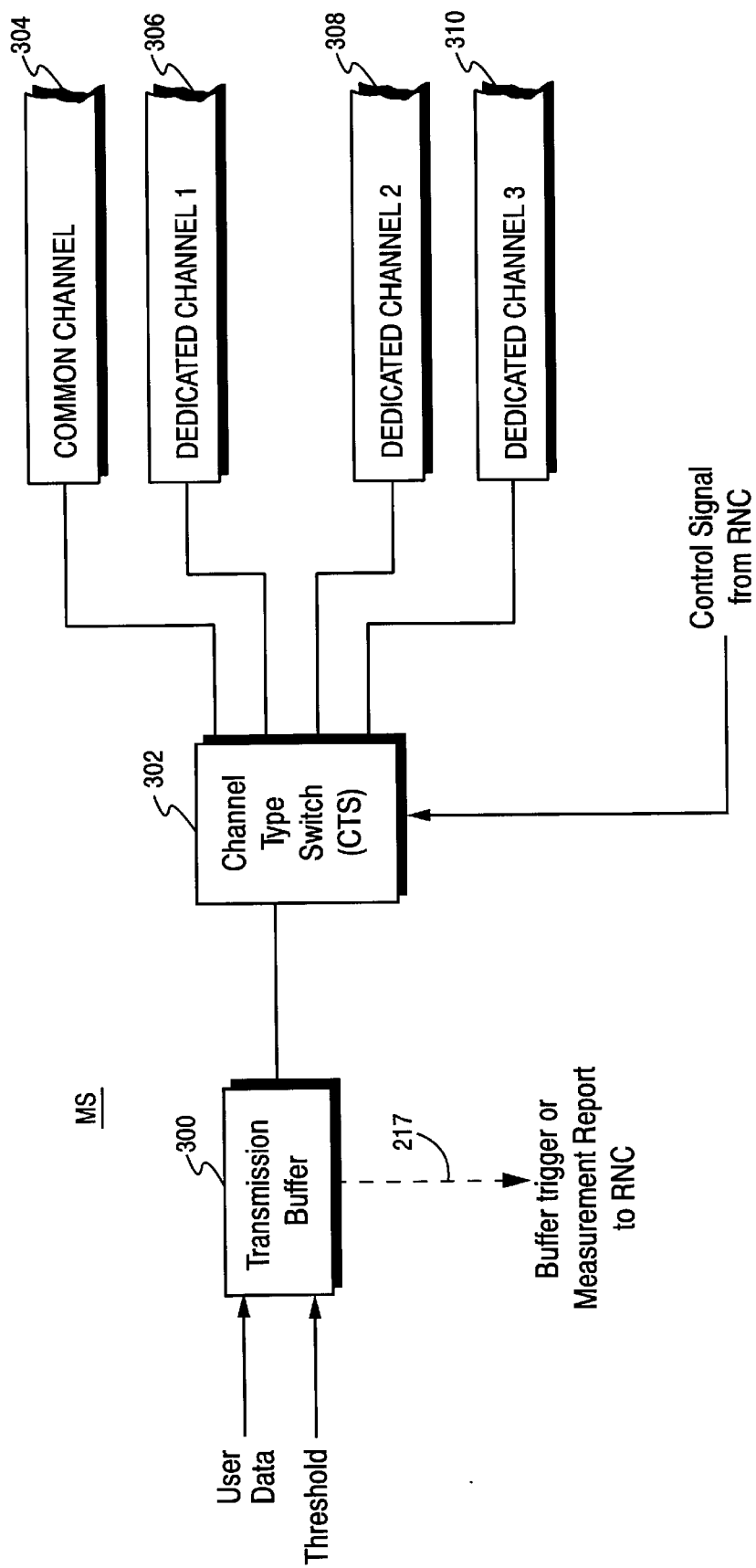
FIG. 13 is a functional block diagram illustrating channel switching at a mobile station in accordance with any embodiment herein.

FIG. 13 illustrates certain aspects of this invention at an exemplary MS 30. Uplink user data is received and stored at a transmission buffer 300, e.g., an RLC buffer at the MS. Packets output from the transmission buffer 300 are routed to a channel-type switch (CTS) 302 (e.g., implemented at the MAC layer) to an appropriate communications channel including one or more common channels 304 or dedicated channels DC1–DC3 (306–310). The channel-type switch is controlled by a signal from the RNC (e.g., from controller 214 or more preferably switch controller 212). The buffer 300 may optionally send a trigger signal to the RNC when the amount of data to be sent exceeds, or dips below, a threshold Dth as described above. Alternatively, measurement reports could be sent specifying incoming and outgoing data rates, the actual data amount buffered, etc. Still further, MS transmit buffer 300 may simply continuously update the RNC as the amount of data stored in the buffer changes over time during the course of a connection and otherwise. Other implementations may involve the mobile more substantially.

By taking into account the amount of traffic in a cell(s) of the user in determining thresholds and/or timer timeout values, actual network conditions are taken into account. Unnecessary switching may be avoided or reduced when the amount of traffic in the cell(s) is low and plenty of channel resources are available. When there is little traffic in a particular cell, it may be beneficial to allow many or all users in that cell to use respective dedicated channels since there is no excess demand for the same. However, when there is substantial traffic in the cell, thresholds and/or timeout values may be adjusted to restrict dedicated channels to those users truly in need of them. Rapid back-and-forth switching of a user from one type of channel to another may be avoided when not necessary. This enables the system to conserve resources and overhead, and better reflect actual network conditions.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a mobile radio communications system having two different types of communications channels including a first type of channel and a second type of channel, a method comprising:

providing the first type of channel to support a user connection, where a user of the user connection is located in a cell defined by a base station;

determining traffic load in at least the cell in which the user is located;

determining whether to switch the user connection from the first type of channel to the second type of channel based at least in part on the determined load in the cell;

determining an amount of data in a buffer associated with the user connection;

dynamically adjusting a timer timeout value based at least in part upon the determined cell load so that the timeout value is a function of the cell load;

determining whether the amount of data in the buffer is less than a buffer threshold;

when the amount of data in the buffer is less than the buffer threshold, starting a timer associated with the adjusted timeout value;

after the timer has been started, determining whether the amount of data in the buffer is still less than the buffer threshold, and if so then switching the user connection from the first type of channel to the second type of channel upon expiration of the timer; and after the timer has been started, resetting the timer and staying on the first type of channel when it is determined that the amount of data in the buffer is greater than the buffer threshold prior to expiration of the timer.

2. The method of claim 1, wherein said determining traffic load step comprises at least one of (i) estimating traffic load in the cell, (ii) measuring traffic load in the cell, and (iii) calculating traffic load in the cell; and wherein the user connection is a radio connection between a mobile unit and the base station in a cellular wideband CDMA inclusive network.

3. The method of claim 1, further comprising dynamically adjusting the buffer threshold based at least in part upon the determined cell load so that the threshold is a function of cell load.

4. The method of claim 1, wherein the first type of channel is a common channel and the second type of channel is a dedicated channel.

5. The method of claim 1, wherein the first type of channel is a dedicated radio channel allocated to support a single user connection and the second type of channel is a common radio channel allocated to support plural user connections.

6. In a mobile radio communications system having two different types of communications channels including a first type of channel and a second type of channel, a method comprising:

providing the first type of channel to support a user connection;

determining a load in a base station cell in which a mobile station (MS) associated with the user connection is located;

dynamically adjusting at least one of a buffer threshold and a timer timeout value based at least in part upon the determined load in the base station cell;

controlling a channel switching decision of whether to switch the user connection from the first type of channel to the second type of channel based upon at least one of the adjusted buffer threshold and the adjusted timer timeout value;

determining an amount of data in a buffer associated with the user connection;

dynamically adjusting the timer timeout value based at least in part upon the determined cell load so that the timeout value is a function of the cell load;

determining whether the amount of data in the buffer is less than the buffer threshold;

when the amount of data in the buffer is less than the buffer threshold, starting a timer;

after the timer has been started, determining whether the amount of data in the buffer is still less than the buffer threshold, and if so then switching the user connection from the first type of channel to the second type of channel upon expiration of the timer; and after the timer has been started, resetting the timer and staying on the first type of channel when it is determined that the amount of data in the buffer is greater than the buffer threshold prior to expiration of the timer.

7. The method of claim 6, further comprising dynamically adjusting the buffer threshold based at least in part upon the determined cell load so that the threshold is a function of cell load.

8. The method of claim 6, wherein the first type of channel is a common channel and the second type of channel is a dedicated channel.

9. In a mobile communications system including plural base stations coupled to a controller and communicating over a radio interface with mobile stations, each base station defining a respective cell in which mobile stations may be located, a control node comprising:

plural buffers, each buffer assignable to support a mobile user connection and having a respective buffer threshold;

channel-type switching circuitry, coupled to the buffers, controllably switching a user connection from a first type of radio channel to a second type of radio channel;

a capacity management function obtaining data indicative of cell loads and causing at least one of timer timeout values and buffer thresholds to be adjusted as a function of the cell loads; and a channel-type switching controller controlling the channel-type switching circuitry to direct the data corresponding to one of the mobile user connections stored in one of the buffers from a first type of radio channel supporting the mobile user connection to a second type of radio channel based at least in part upon at least one of an adjusted timer timeout value and an adjusted buffer threshold.

10. The control node of claim 9, wherein the control node corresponds to a radio network controller (RNC) coupled to plural base stations.

11. The control node of claim 9, wherein the first type of radio channel is one of a dedicated radio channel reserved for one mobile user and a common radio channel shared by plural mobile users and the second type of radio channel is the other of the dedicated radio channel and the common radio channel.

12. The control node of claim 9, wherein the channel switching controller causes the channel-type to switch when an amount of data in the one buffer exceeds an adjusted buffer threshold.

13. The control node of claim 9, further comprising:

means for determining an amount of data in the one buffer associated with the user connection;

means for dynamically adjusting a timer timeout value corresponding to the one buffer based at least in part upon the determined cell load so that the timeout value is a function of cell load;

means for determining whether the amount of data in the one buffer is less than a corresponding buffer threshold;

means for starting a timer when the amount of data in the one buffer is less than the corresponding buffer threshold;

means for determining whether the amount of data in the one buffer is still less than the corresponding buffer threshold after the timer has been started, and if so means for switching the user connection from the first type of channel to the second type of channel upon expiration of the timer.

14. The control node of claim 13, further comprising means for dynamically adjusting buffer thresholds based at least in part upon determined cell loads so that the thresholds are functions of cell load.

* * * * *